United States Patent Office 3,458,429
Patented July 29, 1969

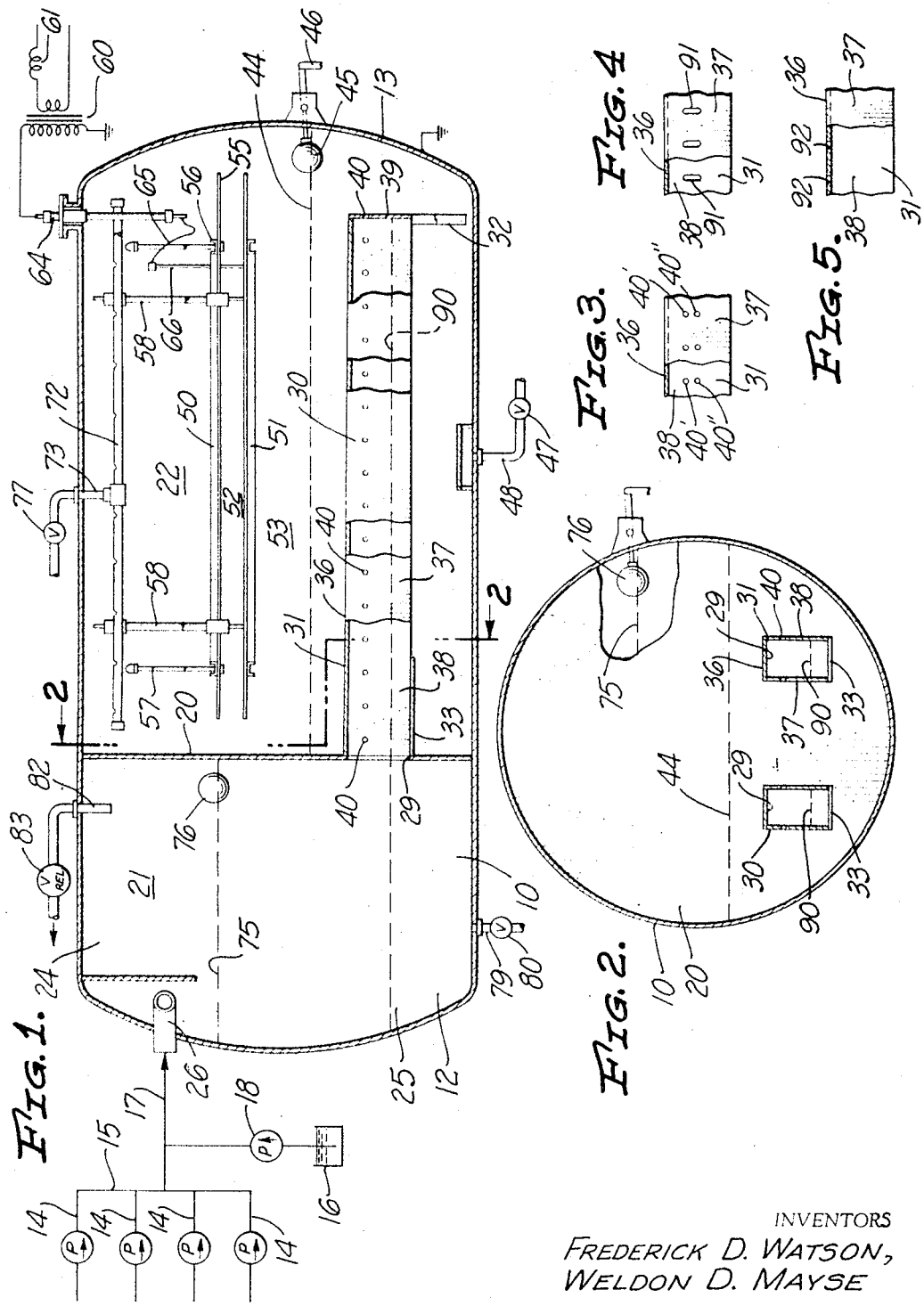

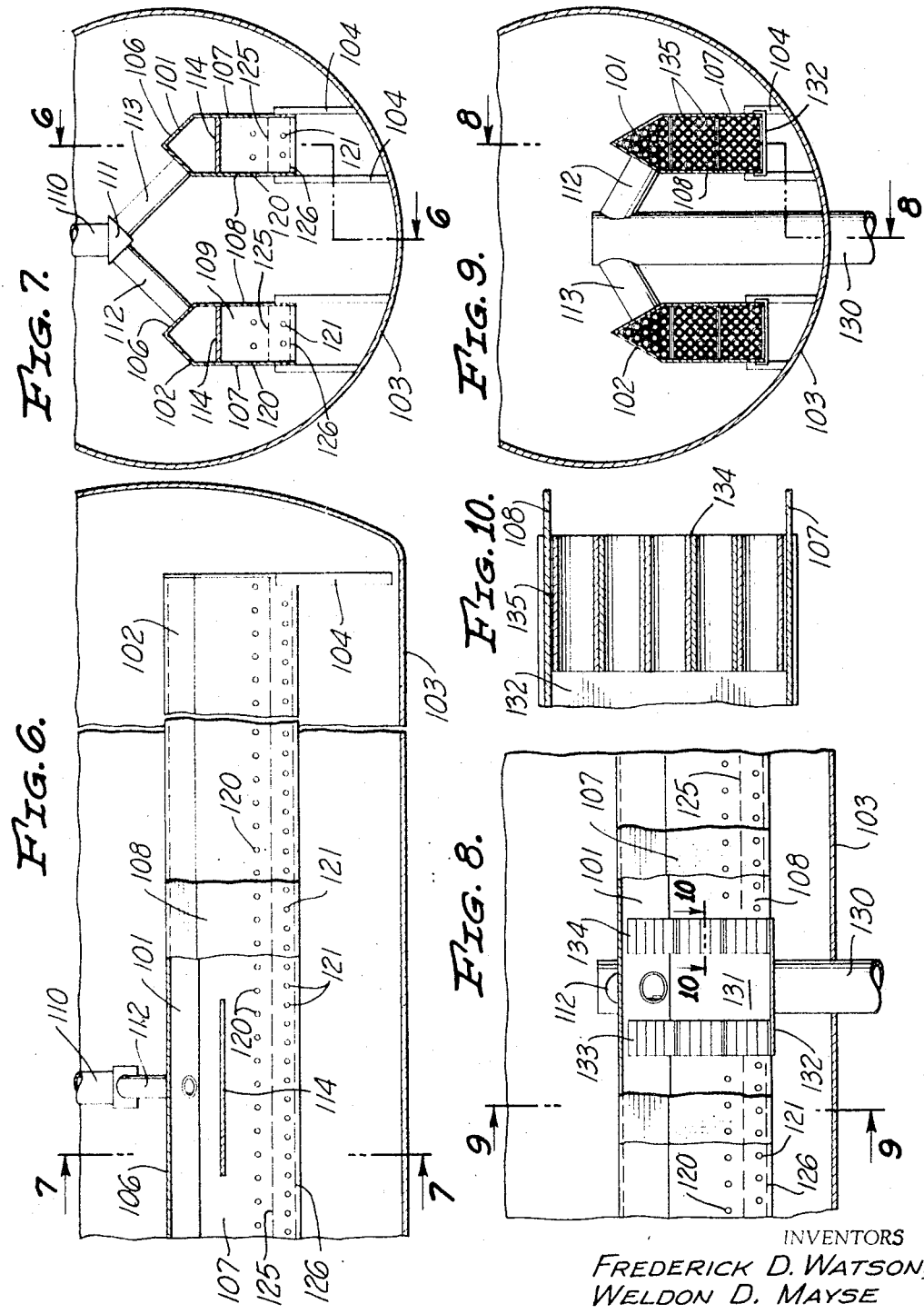

3,458,429
EMULSION TREATMENT
Frederick D. Watson and Weldon D. Mayse, Houston, Tex., assignors to Petrolite Corporation, St. Louis, Mo., a corporation of Delaware
Filed Apr. 18, 1966, Ser. No. 543,208
Int. Cl. C10g 33/02; B01k 1/00
U.S. Cl. 204—302                                   17 Claims

ABSTRACT OF THE DISCLOSURE

A distributor for feeding an incoming liquid into a container of liquid for uniform upward flow of the incoming liquid through the liquid in the container. A trough for receiving the incoming liquid and having closed side and top members and an open bottom, with a row of outlet openings along side and/or top members. Automatic adjustment of distributor flow rate as a function of incoming liquid flow rate while maintaining the uniform distribution characteristic.

---

This invention relates to a new and improved apparatus for uniform feeding of an incoming liquid for upward flow through a body of liquid in emulsion treaters and other equipment.

Historically, increased efficiency in distillate treaters, desalters, and other equipment has resulted from improved distribution into and/or collection from the treating zone. With improved flow of the liquid being treated through the treating zone, a maximum utilization of the cross-sectional area of the treating vessel is approached, with a resultant increase in treating efficiency.

In equipment of this type it is usually desirable to convert the high velocity incoming liquid stream into a slow moving stream which advances substantially nonturbulently along a large passage with substantially laminar flow and with all filaments of the liquid being treated moving with substantially equal velocities in a cross-sectional plane transverse to the flow direction. Various forms of distributors have been used for this general purpose in the past, usually comprising some form of drilled pipe arrangement or some form of inverted pan with weirs or notches along the edges thereof. Some prior art distributors are shown in United States Letters Patent Nos. 2,894,895, 3,141,000, and 3,206,686. These patents also show typical treaters with which the present invention may be utilized. The present invention is suitable for obtaining improved separation in gravity treating systems as well as in electrical and chemical-electrical systems of the type shown in these patents.

It is an object of the present invention to provide a new and improved distributor structure for uniform feeding of an incoming liquid for upward flow through a body of liquid in a treater. A further object is to provide such an apparatus which overcomes disadvantages encountered in drilled pipe distributors and disadvantages encountered with inverted notched weir distributors.

It is a particular object of the invention to provide a new and improved distributor construction which is self adjusting for changes in incoming liquid rate of flow, i.e., a distributor which will uniformly feed the incoming liquid into the treater over a wide range of incoming flow rates, without requiring any control on the incoming flow rate. An additional object is to provide such a distributor which provides the desired uniform feeding and self-adjusting features without encountering plugging and scaling problems.

It is an object of the invention to provide a distributor in the form of an inverted or open bottom trough, with a row of openings in a side or top thereof, such that the pressure across the openings due to the vertical distance between the openings and the incoming liquid-treater liquid interface within the trough is the same for all openings, therefore providing a uniform flow of incoming liquid through all the openings.

It is another object of the invention to provide such a distributor having two rows of openings at different levels providing the self-adjusting operation for one range of flow rates utilizing one row of openings and for another substantially greater range of flow rates utilizing the two rows of openings.

It is an object of the invention to provide a distributor for a treater comprising an inverted horizontally disposed trough mounted within the treater submerged in the body of liquid of the treater, with the trough having an open bottom, a top member and spaced side members, an inlet for feeding the incoming liquid into the trough above the open bottom to provide an internal interface between the incoming liquid and the treater liquid, outlet means for the trough comprising a horizontal row of openings spaced along at least one member of the trough with all portions of the openings being above the open bottom thereof and with the pressure across the openings varying as a function of the distance of the internal interface below the openings, with the internal interface rising and falling within the trough below the level of the openings in response to decrease and increase in flow rate of the incoming liquid.

It is a particular object of the invention to provide such distributor wherein the openings of the outlet means may take various forms, with the proviso that all portions of the openings be above the open bottom of the trough.

The invention also comprises novel details of construction and novel combinations and arrangements of parts, which will more fully appear in the course of the following description. The drawings merely show and the description merely describes preferred embodiments of the present invention which are given by way of illustration or example.

In the drawings:

FIG. 1 is a vertical sectional view of a double compartment electric treater incorporating the invention;

FIG. 2 is a vertical sectional view taken along the line 2—2 of FIG. 1;

FIGS. 3 and 4 are partial views showing various forms for the openings in the trough of FIG. 1;

FIG. 5 is a view similar to that of FIGS. 3 and 4 showing another alternative form for the openings in the trough;

FIG. 6 is a partial vertical sectional view of a treater showing an alternative form of the invention;

FIG. 7 is a partial vertical sectional view taken along the line 7—7 of FIG. 6;

FIG. 8 is a partial vertical sectional view of a treater showing another alternative form of the invention;

FIG. 9 is a partial vertical sectional view taken along the line 9—9 of FIG. 8; and FIG. 10 is an enlarged partial horizontal sectional view taken along the line 10–10 of FIG. 8.

The invention can be incorporated in any suitable upright or horizontal container and is illustrated in FIGS. 1 and 2 as including a horizontally disposed container 10 closed by heads 12 and 13. An incoming liquid, such as a crude oil emulsion from one or more wells or storage tanks, can be pumped through lines 14 to a manifold 15 and thence into the treater. Although not essential, it is often desirable to introduce a small amount of a chemical demulsifying agent into the emulsion ahead of the treater. This agent may be of any known type and will be selected with reference to its ability to said the particular treatment to be carried out in the container. It can be pumped from storage 16 to the inlet line 17 by a metering pump 18.

The interior of the container 10 is divided by a partition 20 to provide a gas separating section 21 and a main treating section or chamber 22. An upper gas space 24 and a lower emulsion space 25 are provided within the section 21. The incoming liquid may be discharged at any position in the chamber 21 but preferably discharges into the gas space 24 through a laterally orificed distributor 26.

Distributor troughs 30, 31 are mounted in the chamber 22 in parallel arrangement, the troughs being supported at the right ends on legs 32 and at the left ends by the partition 20. Openings 29 in the partition 20 provide for fluid flow from the chamber 21 into the troughs 30, 31, respectively. Plates 33 may be provided along the bottom of the troughs adjacent the inlet openings for structural support. The two troughs are identical in construction and only one will be described in detail.

The trough 31 has a top 36, spaced sides 37, 38 and an end 39 which, together with the plate 33 when used, form an inverted trough structure with an open bottom. A horizontal row of openings 40 is provided along a side of the trough. The openings are preferably equally spaced and ordinarily a row of openings will be provided on each side of each trough to aid the desired uniform distribution. Similar openings may also be provided in the end 39. The top 36 may slope downwardly away from the opening 29 a slight amount permitting gas to flow from the trough back into the section 21. In an alternative arrangement, one or more vent openings may be provided in the top 36 of the trough for the purpose of venting gases which may collect within the trough. The operation of the distributor trough will be described in detail hereinbelow. One or more than two distributor troughs may be utilized and the openings 40 may be placed in one side or both sides or in the top of a trough and may extend only part way along a trough. For best operation of a treater, the outlet openings should be arranged to provide outlet streams uniformly distributed across the working area of the treater and the particular arrangement illustrated is presently preferred for containers of this general shape.

In a typical treater, the chamber 22 is filled with a body of liquid comprising a higher density liquid in the lower portion of the chamber and a lower density liquid in the upper portion of the chamber, with the two liquids merging at an interfacial zone indicated by the dashed line 44. The position of the interfacial zone 44 is maintained substantially constant by a level control means of known type, shown as including a float 45 operating a linkage 46 which controls the setting of a valve 47 in a line 48 which withdraws the higher density liquid from the bottom of the chamber 22.

The treater is illustrated herein as incorporating a conventional electrode system for establishing a high voltage electrostatic field in that portion of the chamber 22 above the zone 44 to treat the rising emulsion. Such an electric field will coalesce the dispersed water particles of an emulsion into masses of sufficient size to gravitate to the lower portion of the chamber 22. As shown, upper and lower foraminous electrodes 50, 51 define two treating spaces comprising a main treating space 52 between the electrodes and an auxiliary treating space 53 between the lower electrode 51 and the body of water in the lower portion of the chamber. Each electrode may comprise a sheet of metallic screen 55 supported on a suitable framework 56. Hangers 57 suspend the upper electrode 50 from the container to maintain this electrode at ground potential. The lower electrode 51 is suspended from the container by insulators 58 and is energized by a high voltage transformer 60. The A.C. potential applied to the primary of this transformer is suitably controlled by a choke coil 61. The high voltage terminal of the secondary winding is connected through an inlet bushing 64 to a conductor 65 which in turn is connected to a post 66 rising from the electrode 51 through an opening (not shown of the upper electrode 50.

The treated liquid, typically the oil largely free of dispersed water, is withdrawn from the upper end of the chamber 22, preferably through a multi-orificed piped network 72 comprising two longitudinal pipes centrally connected to a riser pipe 73 extending to a position outside the container. Longitudinal pipes preferably have upwardly facing orifices distributed throughout the upper interior of the chamber 22 to aid in establishing the uniform flow rising mass of liquid in this chamber.

There is an interface in the chamber 21 between the gas in the upper portion thereof and the incoming liquid in the lower portion thereof, indicated by the dashed line 75. The level of this interface is maintained relatively constant by a level control means 76, typically another float and linkage, which controls a valve 77 in the treated liquid effluent line 73. An outlet line 79 with a control valve 80 may be utilized for periodic flushing out of solids which may collect at the lower portion of the chamber 21. The separated gas collecting in the upper portion of the chamber 21 may be removed through a line 82 having an adjustable pressure relief valve 83 therein, which valve is set to maintain any desired back pressure on the container.

In the operation of the treater of FIGS. 1 and 2, the incoming liquid flows in through the distributor 26 into the chamber 21. The liquid then flows through the inlet openings 29 into the troughs 30, 31 and out of the troughs through the outlet openings 40. The incoming liquid then rises slowly through the body of liquid in the chamber 22, during which time the treatment occurs, the treatment ordinarily being separation of some constituent from the incoming liquid, typically the removal of water from an emulsion. The treated liquid accumulates at the upper side of the chamber 22 and is withdrawn through the outlet line 73. As indicated previously, it is highly desirable that during the treatment phase, the liquid being treated move vertically at a slow and uniform rate and that the liquid be uniformly distributed throughout the treatment chamber. This is accomplished with the structure of the invention by providing the outlet openings of the distributor trough substantially uniformly spaced throughout the chamber and by providing a trough construction which produces a uniform pressure across all the outlet openings. With this arrangement, uniform amounts of the incoming liquid are introduced into the treatment chamber over the entire horizontal area of the chamber.

There is an interface, indicated by the dashed line 90, within the distributor trough and the section 21 between the incoming liquid and the higher density liquid in the lower portion of the container. Typically this is the interface between the lighter incoming emulsion and the heavier water which collects in the lower portion of the treater. The pressure of the higher density liquid, e.g., the separated water, acting upwardly on the incoming liquid, e.g., the incoming emulsion, at the interface forces the incoming liquid out the outlet openings. The pressure across an outlet opening is a function of the vertical distance between the opening and the interface within the trough. With a horizontal row of openings, as illustrated in FIG. 1, the pressure is the same across each opening so that there is a uniform pressure acting to feed the incoming liquid out each opening, resulting in a uniform rate of flow of liquid into the treating chamber from each of the openings. With this structure, the rate of flow of liquid from an outlet opening of a trough will be dependent upon the vertical distance between the outlet opening and the interface 90 and will be substantially independent of other factors, such as position of the opening along the trough. It is preferable to have the cross-sectional area of the troughs relatively large so that the velocity of flow of the incoming liquid along the trough is very low and the friction of the incoming liquid along the upper surface of the higher-density liquid is very low. Then there will be negligible pressure drop along the trough, the interface 90 will be substantially horizontal and all the outlet openings will be operating at the same pressure differential.

The distributor trough may be used with an incoming rate of flow which varies over a wide range, without requiring any change or control of the incoming rate of flow. Stated differently, the distributor trough is self adjusting for variations in flow rate as well as for variations in specific gravity and temperature. An increase in incoming flow will increase the quantity of incoming liquid within the trough and move the interface 90 downward. Downward movement of the interface increases the pressure across the outlet openings and thereby increases the rate of flow through the outlet openings. This permits the distributor to handle the increased rate of flow without requiring any regulation on the incoming flow. Similarly, a decrease in the incoming flow rate results in a rising of the interface and a corresponding decrease in flow through the outlet openings. With this distributor design, an incoming rate of flow which varies from one-half the normal to two times the normal can be handled without requiring control of the incoming flow rate.

The operation of the distributor of the invention is in sharp contrast with that of the inverted trough distributor utilizing notches or weirs along the bottom edges. With the notched construction, no appreciable pressure can be developed across the notch and therefore there is no uniform pressure forcing liquid through all of the outlet notches. Also, since there is no appreciable pressure across a notch, there is no self-adjusting operation possible.

While the outlet openings 40 are illustrated as individual spaced holes in FIG. 1, it should be noted that various other arrangements can be utilized for the outlet openings. The choice of shape and arrangement for the outlet openings is primarily dictated by the manufacturing facilities available. FIG. 3 shows one alternative arrangement wherein an outlet opening comprises a pair of closely spaced holes 40', 40''. FIG. 4 illustrates another alternative form wherein the outlet opening is made in the shape of a slot 91.

FIG. 5 illustrates another alternative arrangement, with the outlet openings 92 spaced along the top 36 of the trough rather than in the sides. The operation of the troughs of FIGS. 3, 4 and 5 is the same as that described for the trough of FIG. 1.

In the illustration of FIG. 1, the interfacial zone 44 is positioned above the distributor trough, so that the incoming liquid is distributed into the higher density liquid of the treater. The apparatus will operate equally well with distribution of the incoming liquid into the lower density liquid of the treater. For this arrangement, the interfacial zone 44 will be maintained at a level below that of the row of outlet openings and above that of the open bottom of the distributor trough.

An alternative embodiment of the invention is illustrated in FIGS. 6 and 7, wherein only the distributor portion of the treater is shown. A trough 101 and a similar trough 102 are positioned in the lower portion of a horizontally disposed container 103 with the troughs supported on legs 104. The troughs 101, 102 are identical in construction and only 101 will be described in detail.

The trough 101 has an A-shaped top 106, sides 107, 108 and ends 109 (the other not shown). An inlet pipe 110 is divided at a junction 111 providing a flow line 112 to the trough 101 and another flow line 113 to the trough 102. A horizontal baffle plate 114 may be positioned within the trough directly below the inlet line 112 for the purpose of preventing direct downward flow of the incoming liquid.

A horizontally disposed row of openings 120 is provided in the sides and ends of the trough. A second horizontal row of openings 121 is provided in the sides and ends of the trough at a position below the first row of openings.

The internal interface within the trough, indicated by the dashed line 125, corresponds to the interface 90 in the embodiment of FIG. 1. Under one set of operating conditions, this interface 125 will be at a level between the level of the upper row of openings and that of the lower row of openings. The operation of the distributor will be the same as described in conjunction with the embodiment of FIG. 1, with the interface 125 rising and falling between the levels of the two rows of openings as the rate of flow of the incoming liquid varies.

For another set of operating conditions with a much higher inlet rate of flow, the interface will be between the lower row of openings and the bottom edge of the trough, as indicated by the dashed line 126. Under these conditions, both rows of openings will serve as outlet openings, with the interface 126 rising and falling between the levels of the bottom edge and the lower row of openings. This arrangement provides for operation of the treater at two quite different ranges of incoming fluid flow. One particular use for this type of structure is with two treaters operated in parallel. Under normal conditions, the interface 125 will be maintained between the two rows of openings. When for some reason, one treater is taken out of service, the other treater will handle the entire flow, with the interface maintained between the lower row of openings and the bottom of the distributor. For this particular arrangement, the total area of the openings for the lower row will be greater than the total area of the openings of the upper row in order to obtain the desired double rate of flow, since the pressure across the openings of the lower row will be less than the pressure across the openings of the upper row. When all the openings are the same area, as illustrated in FIG. 6, a larger number of openings will be provided in the lower row.

The total area of the openings of a row and hence the number and size of individual openings is readily calculated for any specific installation, based upon the rate of flow desired and the pressure differential which can be obtained in the physical size of trough and container available.

Another alternative structure is shown in FIGS. 8 and 9. This embodiment is similar to that of FIGS. 6 and 7 and corresponding elements are identified by the same reference numerals. The operation of the embodiment of FIGS. 8 and 9 is the same as that of the embodiment of FIGS. 6 and 7, the two structures differing in the design of the inlet portion of the system. An inlet pipe 130 projects upward through the bottom of the container 103 providing for incoming fluid flow into the lines 112, 113, feeding the distributor troughs 101, 102, respectively. The incoming liquid is introduced into a space 131 defined by the trough sides and top, a bottom baffle 132, and flow straighteners 133, 134. The flow straightener 134 is formed of a plurality of tubular sections 135 disposed in horizontal arrangement and retained in place within the trough by the baffle 132. The flow straightener 133 is similarly constructed. The baffle 132 and the flow straighteners 133, 134 function to direct the incoming liquid into relatively nonturbulent flow patterns along the length of the trough.

The distributor of the present invention has a number of advantages over distributors utilized in the past for the purpose of obtaining uniform flow of an incoming liquid through the body of liquid of a treater or the like. The new distributor allows solids to drop out without plugging the distribution orifices. At the same time it is self adjusting for changes in incoming flow rates and for changes in the gravity of the incoming liquid. The velocity of the liquid at the outlet openings is low and is uniform for all of the openings, curtailing unwanted mixing and hydraulic disturbances. The distributor of the invention is substantially less susceptive to scaling, to maldistribution of the incoming liquid due to friction losses and to maldistribution due to inlet stream kinetic energy. The distributor is readily used for discharging the incoming liquid into the higher density liquid of the treater or into the lower density liquid of the treater. The distributor is readily used for handling drastic changes in incoming flow rate by means of the two rows of outlet openings, permitting the upper row to be used for normal operation and the lower row to be used as a reserve distributor.

Although exemplary embodiments of the invention have been disclosed and discussed, it will be understood that other applications of the invention are possible and that the embodiments disclosed may be subjected to various changes, modifications and substitutions without departing from the spirit of the invention.

We claim as our invention:

1. In an electric treater, the combination of:
   (a) a container having an electric treating section for a body of a first lower-density liquid and a second higher-density liquid, respectively above and below an interfacial zone within said treating section;
   (b) an electrode system immersed within said first lower-density liquid and extending across substantially the entire horizontal cross-section of said treating section;
   (c) an inverted trough mounted in said treating section and said trough having enclosing side and top members and an open bottom;
   (d) an inlet for feeding an incoming liquid into the trough, and said incoming liquid comprising a mixture of said first and second liquids;
   (e) said trough including passage means through at least one of said members, said passage means being disposed in a horizontal zone along said one member, and said trough having on said side member an imperforate portion extending downwardly below said horizontal zone containing said passaage means;
   (f) said trough residing in said treating section at a level where the second higher-density liquid covers at least the bottom of said imperforate portion under normal rates of flow of the incoming liquid into the trough whereby an interface is established within said trough between the incoming liquid and said second higher-density liquid;
   (g) said trough having a sufficient cross-section to accommodate flow of incoming liquid along the trough whereby said interface within said trough remains substantially horizontal under normal rates of flow of the incoming liquid into the trough, and
   (h) the total area of said passage means in the trough being correlated to the vertical dimension of said imperforate portion so that the interface within said trough remains below said passage means and above the lower extremity of said imperforate portion under normal rates of flow of the incoming liquid into the trough at a substantial pressure differential across said passage means.

2. The treater of claim 1 wherein said trough has a horizontal cross-sectional area which is a substantial portion of the horizontal area occupied by said electrode system in said electric treating section of said treater.

3. The treater of claim 1 wherein said trough contains a baffle positioned adjacent said inlet to divert horizontally said incoming liquid into said trough.

4. In combination with a vessel containing superimposed bodies of immiscible liquids exiting through respective pipe means, at least one of which is equipped with a valve, said liquids comprising a first lower-density liquid in an upper portion of the vessel and a second higher-density liquid in a lower portion of the vessel, there being an interfacial zone at the junction of said bodies of liquids, a fluid distribution system for uniform upward feeding of an incoming liquid irrespective of changes in volumetric rate of flow of the incoming liquid, said incoming liquid comprising at least in part additional quantities of said second higher-density liquid, said fluid distribution system including:
   a horizontally disposed trough mounted in said vessel and providing within the trough a variable-level distribution space opening downwardly to said body of said second higher-density liquid, said trough having at least one wall member bounding said distribution space;
   outlet means for said trough comprising horizontally disposed passage means through said member and distributed along said member, all portions of said passage means being at a level above the bottom of said trough and the bottom of said distribution space therein, said trough providing an imperforate longitudinal portion in a zone between the level of said passage means and the bottom of said variable-level distribution space with the lower edges of said imperforate portion being at the bottom of said distribution space;
   inlet means feeding said incoming liquid at a substantial pressure differential across said passage means to the upper interior of said distribution space at rates to form and maintain therein at a level above the bottom thereof but below said passage means a substantially horizontal liquid-liquid interface between an upper longitudinally-flowing mass of the incoming liquid and a lower relatively static body of said second higher-density liquid in open communication at the bottom of said distribution space with the body of said second higher-density liquid in the lower portion of said vessel, whereby the pressure head effective in exuding said incoming liquid through said passage means varies with the height of said liquid-liquid interface in said variable-level distribution space, said liquid-liquid interface bridging said trough providing a seal of said second liquid at the lower surface of said distribution space; and
   means for maintaining substantially constant the level of said second higher-density liquid relative to the bottom of said distribution space, said last-named means including a level-control means responsive to changes in level of said interfacial zone in said vessel at a position outside said distribution space, and means operatively connecting said level-control means to said valve in said one of said pipe means for maintaining said interfacial zone at a substantially constant level in said vessel irrespective of changes in level of said liquid-liquid interface within said distribution space by maintaining the level of said interfacial zone above said bottom and spaced vertically from said outlet means.

5. An apparatus as defined in claim 4, in which said passage means of said outlet means are in the form of individual holes horizontally spaced along the trough member.

6. An apparatus as defined in claim 4, in which said passage means of said outlet means are in the form of groups of closely spaced holes, said groups of holes being horizontally spaced along the trough member.

7. An apparatus as defined in claim 4, in which said passage means of said outlet means are in the form of slots horizontally spaced along the trough member.

8. A combination as defined in claim 4 in which said imperforate longitudinal portion of said trough is of a height at least about one-half of the height of said distribution space to provide for substantial change in level of said liquid-liquid interface bridging said trough.

9. A combination as defined in claim 8 including second horizontally disposed passage means through said trough member and distributed along said member, said second passage means being below the level of the one passage means but above said imperforate longitudinal portion of said trough, said second passage means being exposed to said incoming liquid for exuding same therefrom when said liquid-liquid interface lowers to a level below said second passage means as the result of substantially increased volume of incoming liquid entering said distribution space.

10. A combination as defined in claim 4 in which said trough includes spaced longitudinally-extending side members bounding said distribution space and a top member closing the top of said space.

11. An apparatus as defined in claim 10, in which said passage means of said outlet means are located in said top member.

12. An apparatus as defined in claim 1, in which said passage means of said outlet means are located in at least one of said side members.

13. An apparatus as defined in claim 12, in which said outlet means includes second horizontally disposed passage means through said one member and spaced along said member of said trough with all portions of the passage means being above the bottom of said distribution space, said second passage means being positioned between said bottom and the first of said passage means, said liquid-liquid interface rising and falling within said trough below the level of at least one of said passage means.

14. An apparatus as defined in claim 4 comprising two of said troughs disposed in parallel relation, each of said troughs having at least one of said passage means in the wall member thereof all in the same horizontal plane, and including means for directing said incoming liquid to the inlet of each trough.

15. In a treater, the combination of:
(a) a vessel for containing superimposed bodies of immiscible liquids which exit from said vessel through respective outlet means, said liquids comprising a first liquid and a second liquid having a higher-density than said first liquid, said liquids being vertically separated by an interfacial zone;
(b) an inverted trough mounted in said vessel, and said trough having an open bottom and enclosing top and side members;
(c) an inlet for feeding into said trough an incoming liquid comprising a mixture of said first and second liquids;
(d) said trough containing in at least one of said members passage means disposed in a horizontal zone for discharging the incoming liquid from said trough into said vessel, and said trough having on said side members an imperforate portion extending downwardly below said horizontal zone containing said passage means;
(e) control means associated with said outlet means for maintaining the interfacial zone between said first and second liquids intermediate the vertical extent of said vessel;
(f) said trough mounted in said vessel relative to the interfacial zone so that the second liquid covers at least part of said imperforate portion below said passage means whereby an interface is established within said trough between the incoming liquid introduced therein from said inlet and said second liquid which rises into said open bottom;
(g) said trough having a sufficient cross-section to accommodate flow therein of said incoming liquid whereby said interface within said trough remains substantially horizontal under normal rates of flow of the incoming liquid into said trough; and
(h) the total area of said passage means in said trough being correlated to the vertical dimension of said imperforate portion so that the interface within said trough remains below said passage means and above the lower extremity of said imperforate portion under all normal rates of flow of the incoming liquid into said trough at a substantial pressure differential across said passage means.

16. An apparatus as defined in claim 4 in which said interfacial zone is maintained below said outlet means.

17. An apparatus as defined in claim 4 in which said interfacial zone is maintained above said outlet means.

References Cited

UNITED STATES PATENTS

| | | | |
|---|---|---|---|
| 2,573,172 | 10/1951 | Ennis | 173—172 |
| 2,971,376 | 2/1961 | Glasgow | 73—200 |
| 3,290,935 | 12/1966 | McCarter | 73—200 |

ALAN COHAN, Primary Examiner

U.S. Cl. X.R.

137—172, 574, 592

UNITED STATES PATENT OFFICE
CERTIFICATE OF CORRECTION

Patent No. 3,458,429　　　　　　　　　　　　July 29, 1969

Frederick D. Watson et al.

It is certified that error appears in the above identified patent and that said Letters Patent are hereby corrected as shown below:

Column 2, line 30, insert -- a -- between "such" and "distributor"; line 72, change "said" to -- aid --.
Column 4, line 5, insert closing parenthesis after "shown"
Column 9, line 13, (claim 12), change numeral "1" to -- 10 --.

Signed and sealed this 4th day of November 1969.

(SEAL)
Attest:

Edward M. Fletcher, Jr.　　　　　　　　WILLIAM E. SCHUYLER, JR.
Attesting Officer　　　　　　　　　　　　Commissioner of Patents